(12) United States Patent
Herman et al.

(10) Patent No.: US 11,370,498 B1
(45) Date of Patent: Jun. 28, 2022

(54) BOOSTER AXLE AND SYSTEM FOR COUPLING BOOSTER AXLE TO A PAYLOAD

(71) Applicant: Quickthree Technology LLC, Yardley, PA (US)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 210 days.

(21) Appl. No.: 16/775,645

(22) Filed: Jan. 29, 2020

Related U.S. Application Data

(60) Provisional application No. 62/798,622, filed on Jan. 30, 2019.

(51) Int. Cl.
  *B62D 53/06* (2006.01)
  *B62D 61/00* (2006.01)
(52) U.S. Cl.
  CPC ........... *B62D 53/067* (2013.01); *B62D 61/00* (2013.01)
(58) Field of Classification Search
  CPC ...... B61D 61/00; B62D 53/04; B62D 53/045; B62D 53/06; B62D 53/067; B60P 1/64; B60P 1/6418; B60P 1/649
  See application file for complete search history.

(56) References Cited

U.S. PATENT DOCUMENTS

| | | | | |
|---|---|---|---|---|
| 2,780,475 A | * | 2/1957 | Koerner | B62D 53/067 280/414.5 |
| 3,460,862 A | * | 8/1969 | Abolins | B60P 1/6436 294/82.1 |
| 3,473,678 A | * | 10/1969 | Levitt | B60P 1/6445 414/347 |
| 4,302,022 A | * | 11/1981 | Schoeffler | B60G 17/00 280/417.1 |
| 4,558,879 A | * | 12/1985 | Palfinger | B62D 53/04 280/406.1 |
| RE32,736 E | * | 8/1988 | Lovell | B60G 5/00 180/41 |
| 4,969,659 A | * | 11/1990 | Ehrlich | B62D 53/067 280/407.1 |
| 5,904,364 A | * | 5/1999 | Wylezinski | B62D 53/067 280/401 |
| 6,419,247 B1 | * | 7/2002 | Moran | B62D 53/045 280/476.1 |
| 2014/0262591 A1 | * | 9/2014 | Turner | B62D 21/18 180/312 |
| 2018/0236839 A1 | * | 8/2018 | Rasner | B62D 53/0857 |

* cited by examiner

*Primary Examiner* — Kevin Hurley
*Assistant Examiner* — Maurice L Williams
(74) *Attorney, Agent, or Firm* — Sheehan Phinney Bass & Green PA

(57) ABSTRACT

A booster axle assembly includes a wheel axle, a suspension system coupled to the wheel axle, a booster frame supported by the suspension system, a main link coupled via a first hinged connection to a rear portion of the booster frame and extending from the first hinged connection in an upward and forward direction, a lock assembly coupled to a forward end of the main link via a second hinged connection, and a lockup frame (with a curved bottom portion that defines a cradle) coupled to a front end of the booster frame by a third hinged connection and coupled to the lock assembly by a fourth hinged connection and a fifth hinged connection.

16 Claims, 8 Drawing Sheets

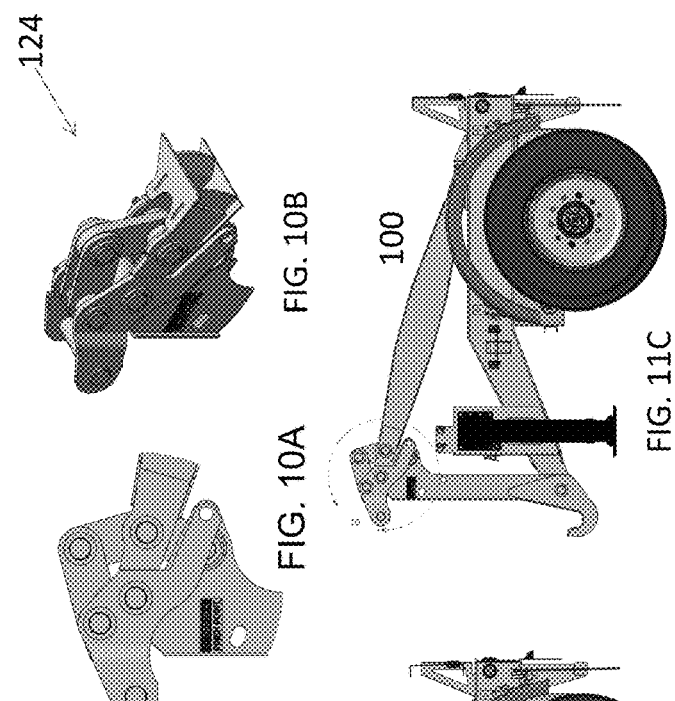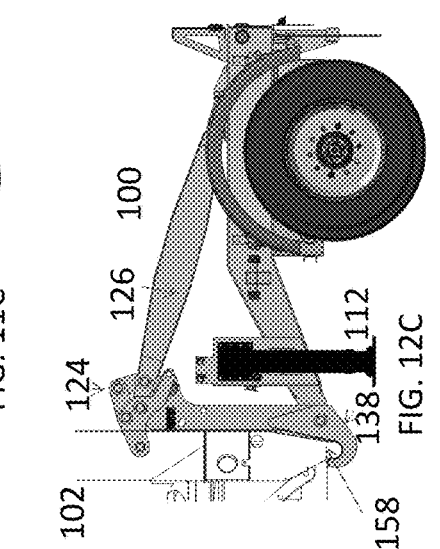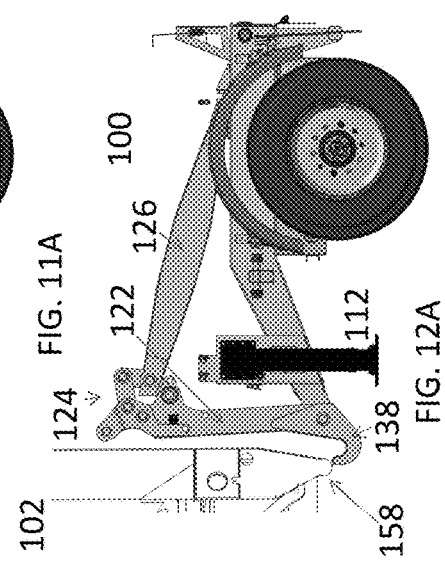

BOOSTER AXLE AND SYSTEM FOR COUPLING BOOSTER AXLE TO A PAYLOAD

CROSS-REFERENCE TO RELATED APPLICATION(S)

This application claims the benefit of U.S. Provisional Patent Application Ser. No. 62/798,622, filed Jan. 30, 2019, and entitled BOOSTER AXLE AND SYSTEM FOR COUPLING BOOSTER AXLE TO A PAYLOAD. The disclosure of the prior application is incorporated by reference herein in its entirety.

FIELD OF THE INVENTION

This application relates a booster axle and, more particularly, a booster axle having a coupling system that is easy to connect and/or disconnect from a payload/trailer.

BACKGROUND

Transporting heavy equipment and the like on roads can be challenging. Booster axles can provide much needed additional load carrying capacity when needed. Booster axles, however, can be difficult and labor intensive to attach and detach.

SUMMARY OF THE INVENTION

In one aspect, a system to facilitate coupling a booster axle assembly to a payload on a trailer (or the like) is disclosed. The system includes the booster axle assembly and the structural features on the payload/trailer. The booster axle assembly has a wheel axle (with wheels), a suspension system coupled to the wheel axle, a booster frame supported by the suspension system, a main link coupled via a first hinged connection to a rear portion of the booster frame and extending from the first hinged connection in an upward and forward direction, a lock assembly coupled to a forward end of the main link via a second hinged connection, and a lockup frame (with a curved bottom surface that defines a cradle) coupled to a front end of the booster frame by a third hinged connection and coupled to the lock assembly by a fourth hinged connection and a fifth hinged connection. The payload or trailer has a back end with a lip configured to fit within the cradle on the booster axle assembly, and a structural element (e.g., a notch in a bracket, or the like) to mate with (e.g., a pin on) the lock assembly on the booster axle assembly.

In another aspect, a method is disclosed of securing a booster axle assembly, like the one mentioned above, to a payload on a trailer, like the one mentioned above. The method basically includes providing the booster axle assembly, positioning the payload onto the trailer, and pushing the payload into the booster axle assembly with the trailer (e.g., by backing the trailer into the booster axle assembly). As discussed herein, in a typical implementation, the simple act of backing a trailer/payload into the booster axle can cause the booster axle assembly to engage the payload automatically (i.e., without further involvement from a human beyond simply backing up the trailer, perhaps).

In yet another aspect, the booster axle assembly itself is disclosed. As mentioned above, the booster axle assembly includes a wheel axle, a suspension system coupled to the wheel axle, a booster frame supported by the suspension system, a main link coupled via a first hinged connection to a rear portion of the booster frame and extending from the first hinged connection in an upward and forward direction, a lock assembly coupled to a forward end of the main link via a second hinged connection, and a lockup frame (with a curved bottom portion that defines a cradle) coupled to a front end of the booster frame by a third hinged connection and coupled to the lock assembly by a fourth hinged connection and a fifth hinged connection.

In some implementations, one or more of the following advantages are present.

For example, in a typical implementation, the booster axle can be coupled to the base of the payload on the trailer, for example, and/or decoupled therefrom, automatically and easily, usually without the use of hand tools or the like, and without requiring much physical effort from the person charged with coupling or decoupling the booster axle assembly. The booster axle's structural configuration and associated functionalities and the corresponding features on the payload or trailer, discussed below, facilitate this ease of operation.

Other features and advantages will be apparent from the description and drawings, and from the claims.

BRIEF DESCRIPTION OF THE DRAWINGS

FIG. 9A is a side view of an exemplary implementation of a locking assembly (in an unlocked configuration) connected to a lockup frame and main link of a booster axle assembly.

FIG. 9B is a perspective view of the locking assembly of FIG. 9A.

FIG. 10A is a side view of the locking assembly of FIG. 9A (in a locked configuration).

FIG. 10B is a perspective view of the locking assembly (in the locked configuration) of FIG. 10A.

FIGS. 11A-11C show the movements that an exemplary booster axle assembly would experience as a payload on a trailer is backed into the booster axle assembly and the booster axle assembly automatically engages the payload.

FIGS. 12A-12C show an exemplary booster axle assembly and an exemplary payload being backed into the booster axle assembly.

DETAILED DESCRIPTION

FIGS. 1-12C, for example, show exemplary implementations of a booster axle assembly 100 (also referred to herein as simply "booster axle").

Figure 6:
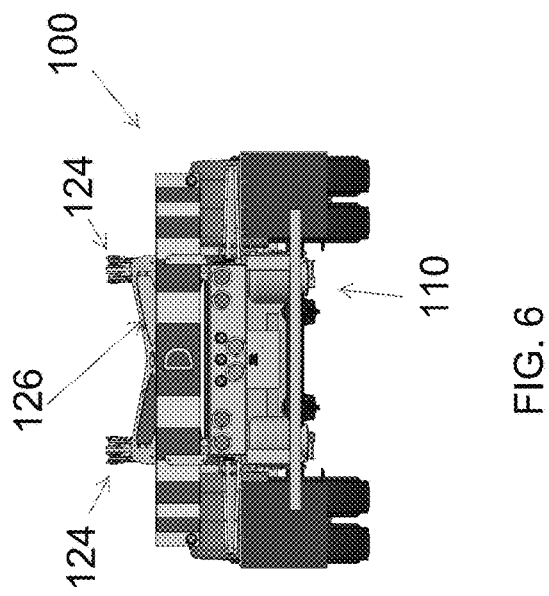
FIG. 6 is a rear view of the booster axle assembly of FIG. 1.
Figure 3:
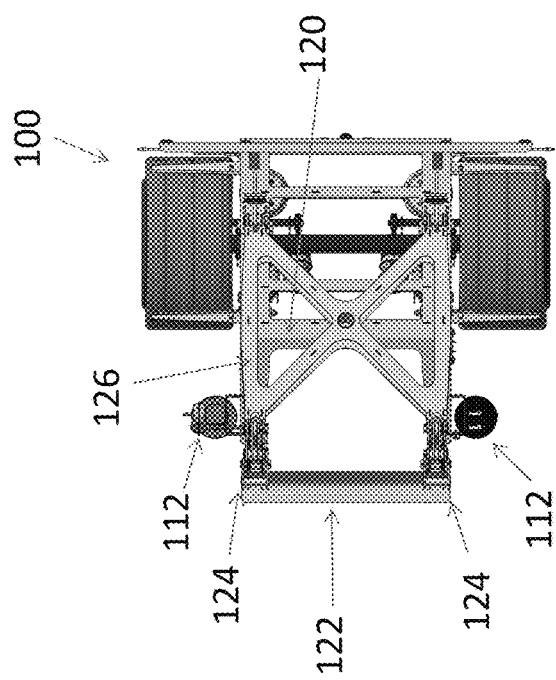
FIG. 3 is a top view of the booster axle assembly of FIG. 1.
Figure 5:
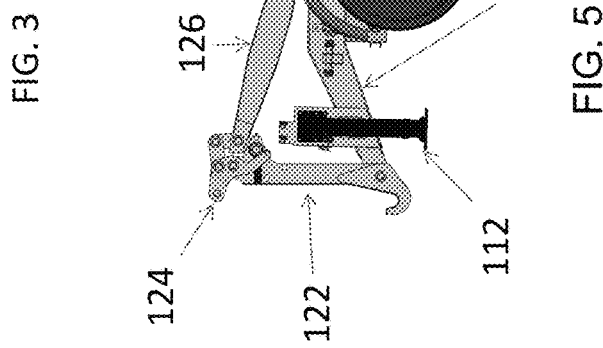
FIG. 5 is a side view of the booster axle assembly of FIG. 1.

The booster axle 100 can be connected to the rear end of a payload 102 on a trailer 104, as shown in FIG. 6 for example, to effectively boost the number of axles in the trailer system to support the payload 102.

The payload 102, of course, can be virtually any kind of payload. In the example of FIG. 6, however, the payload 102 is a Quickload™ system, available from Smart Sand® LLC (the applicant of the current application), with a base that is specially designed and configured to engage the booster axle 100 in the manner disclosed herein. The Quickload™ system in the illustrated figure is shown lying on its side atop the trailer 104 so that its base, which is specially designed and configured to engage the booster axle, is at the rear end of the trailer 104 where the booster axle 100 is located.

In the illustrated configuration, the booster axle 100 is supporting part of the weight of the Quickload™ system, thereby decreasing the weight that the other trailer axles need to bear. More generally, attaching the booster axle 100 to a trailer in this manner effectively increases payload-carrying capacity of the trailer system by distributing the payload weight across more axles. This can be particularly important when the payload that the trailer has to carry is a heavy one, like the Quickload™ system, for example.

As discussed herein, the illustrated booster axle 100 (and the cooperating base on the payload 102) are specially configured so that the booster axle 100 can be connected and/or disconnected from the base of the payload 102 easily.

For example, in a typical implementation, the booster axle 100 can be connected to the base of the payload 102 simply by aligning the trailer 104 (carrying the payload 102) and the booster axle 100, and then backing the trailer 104 up into the booster axle 100 (while the booster axle's brake is engaged). This causes the booster axle 100 to engage the base of the payload 102 (at the back end of the trailer 104) automatically. At that point a person can insert a safety locking pin into a locking pin aperture to prevent the booster axle and payload from subsequently becoming disengaged unintentionally.

Figure 1:
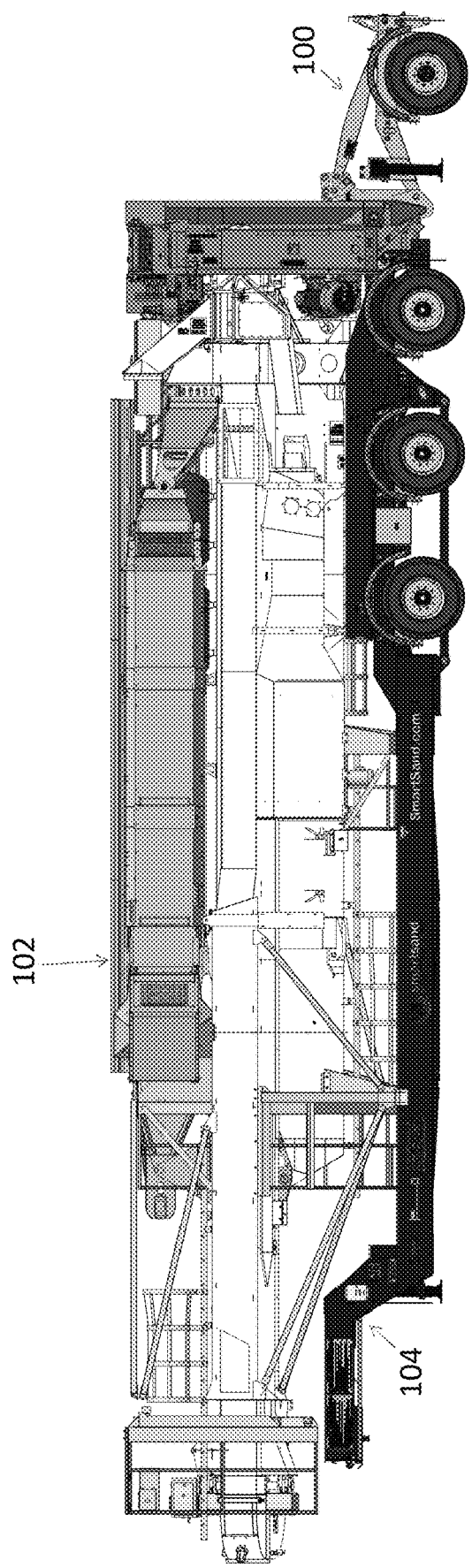
FIG. 1 is a side view of an exemplary implementation of a booster axle assembly coupled to a payload on a trailer.

FIG. 1 shows an example of a booster axle 100 connected to the base of a payload 102 at the back end of a trailer 104. The payload 102 in the illustrated example is the Quickload™ system that has a base that is configured to engage the booster axle 100.

In a typical implementation, the booster axle 100 can be disconnected from the base of the payload 102 with a great deal of ease, too. In this regard, a person might set the dolly leg(s) on the booster axle 100 to an appropriate height (e.g., 5 inches or less from the ground, or thereabouts) to catch the booster axle 100 once it is released from the base of the payload 102. The person might then remove the safety locking pin from the locking pin aperture. Then, the payload 102 can be pulled away from the booster axle 100 (e.g., by pulling the trailer 104 forward while the booster axle's brake is engaged). This causes the booster axle 100 to disengage from the base of the payload 102, automatically.

Figure 2:
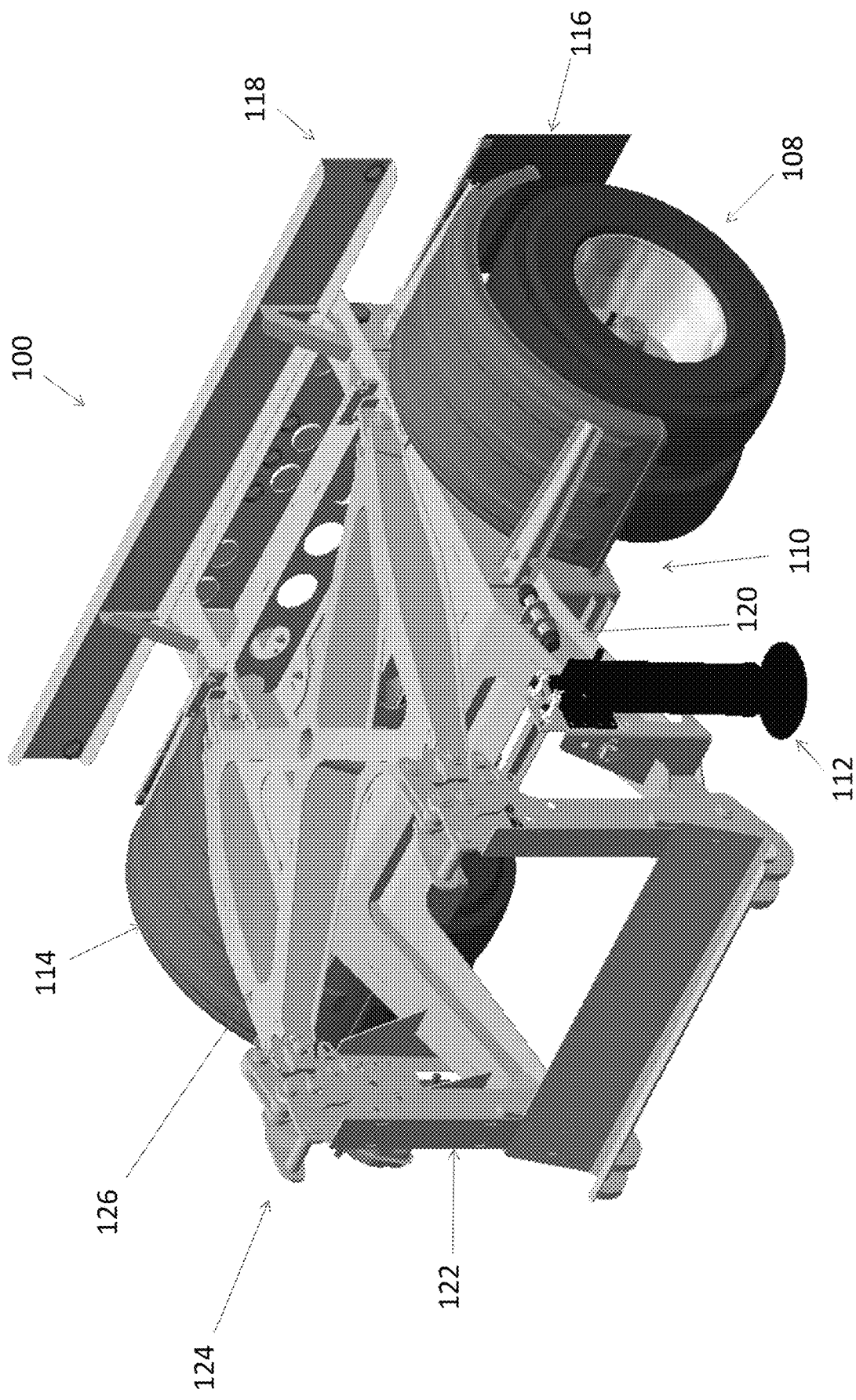
FIG. 2 is a perspective view of the booster axle assembly of FIG. 1.
Figure 4:
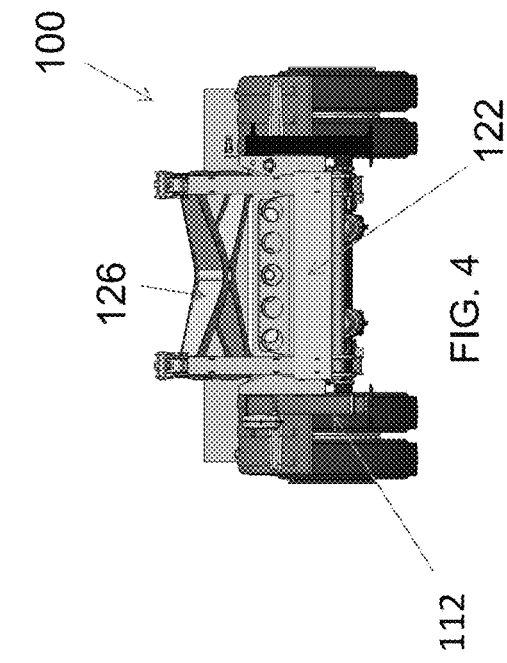
FIG. 4 is a front view of the booster axle assembly of FIG. 1.

FIG. 2 shows an example of a booster axle 100 standing alone, separated from any payload or trailer.

Thus, it should be understood that, in a typical implementation, the booster axle 100 can be coupled to the base of the payload 102 on the trailer 104 and/or decoupled from the base of the payload 102, automatically and easily, usually without the use of hand tools or the like, and without requiring much physical effort from the person charged with coupling or decoupling the booster axle 100. The booster axle's structural configuration and associated functionalities, discussed below, facilitates this ease of operation.

The booster axle 100 has multiple rigid frame elements that are connected together and interact with one another as shown in the figures and otherwise described herein. These rigid frame elements are supported by four wheels 108 through a suspension system 110, which is coupled to the wheel axle. Adjustable height dolly legs 112 extend from the bottom of the rigid frame elements towards the ground. Fenders 114 are provided over the wheels 108, and mud flaps 116 are provided behind the wheels 108. A bumper structure 118 is provided at the rear end of the booster axle 100.

More specifically, the rigid frame elements in the illustrated booster axle 100 form a booster frame 120, a lockup frame 122, lock assemblies 124, and a main link 126. The booster frame 120 is supported by the booster axle's suspension system, which, in a typical implementation, is an air suspension system. The main link 126 is coupled, via a first hinged connection H1, to the rear portion of the booster frame 120 and extends from there in an upward and forward direction to the lock assemblies 124. Each lock assembly 124 is coupled to the front end of the main link 126 via a second hinged connection H2. The lockup frame 122 is coupled to a front end of the booster frame 120 at its lower end by third hinged connections H3. The upper end of the lockup frame 122 is coupled to each lock assembly 124 by a fourth hinged connection H4 and a fifth hinged connection H5.

The lockup frame 122 has an upper portion with flat, forward-facing surfaces that are substantially vertical and a curved bottom portion that defines a cradle 138 that extends laterally across the lockup frame 122. The cradle 138 is configured to physically engage and hold/support a portion of the base of the payload 102 when the booster axle 100 is engaged to the payload 102.

Each lock assembly 124 has a pin (P) that is configured to engage a corresponding notch on the base of the payload 102 when the lock assembly 124 is in a locked configuration and the booster axle 100 is engaged to the payload 102. In this regard, each lock assembly 124 has a collection of links and hinged connections that collectively, and automatically, cause the pin (P) to move into engagement with the notch when the payload 102 is backed into the booster axle 100 (and the booster axle's brake is engaged).

The specific configuration of the rigid frame elements that form the booster frame 120, lockup frame 122, lock assemblies 124, and main link 126, and their interconnections, can vary. What follows is a detailed description of the configuration shown in the figures.

The illustrated booster frame 120 has a back end portion and a front end portion. The back end portion of the booster frame 120 is configured to lie in a substantially horizontal plane when the booster axle 100 is connected to a trailer/payload. The front end portion of the booster frame 120 extends in a forward direction from the back end portion and lies in a second plane that is angled slightly downward (e.g., between about 20 and 40 degrees) from the substantially horizontal plane.

The back end portion of the booster frame 120 is connected to, and supported by, the booster axle's air suspension system 110 on both the right and left sides of the booster axle 100. (See FIG. 7, which is a side view of the booster axle 100 with the left side (or nearest) tire having been removed).

In this regard, the booster axle's air suspension system 110 has a control arm 134 that is coupled to and supported by the booster axle's axle 136. The control arm 134 extends in a forward direction and a rearward direction from the axle 136. The back end of the control arm 134 supports a rolling lobe air spring 128. The front end of the control arm 134 is connected, via a hinged connection $H_{susp}$ to a bracket 130. The horizontal back end portion of the booster frame 120 is supported by the air suspension system's rolling lobe air spring 128 in the rear, and by the air suspension system's control arm 134 (via bracket 130) in the front.

The booster axle 100 has air connections 146 for providing air to the rolling lob air spring(s) 128 and one or more air lines (not shown in the figures) that carry the air between the air connections and the rolling lobe air spring(s) 128. Each rolling lobe air spring 128 has a flexible bellows 148, a piston 150 coupled to the bottom of the flexible bellows 148, and a bead plate 151 at the top of the flexible bellows. The flexible bellows 148, the piston 150, and the bead plate 151 collectively define an internal air reservoir 152. In a typical implementation, one or more air ports are provided (e.g., on the bead plate) to introduce air from the air line(s) into the internal air reservoir 152 and to release air from the internal air reservoir 152.

During normal suspension operation, the flexible bellows 148 expands as air is introduced into the internal air reservoir 152, and collapses as air is released from the internal air reservoir 152. When the flexible bellows 148 expands, this causes the bead plate 151 to press up against the booster frame 120 (tending to raise the booster frame), and simultaneously causes the piston 150 to press down on the back end of the control arm 134. Pressing down on the back end of the control arm 134 causes the back end of the control arm 134 to move in a downward direction, with the control arm rotating about the axle 136 so that the front end of the control arm 134 will move in an upward direction, thereby lifting the booster frame 120 (i.e., the front end of the horizontal portion of the booster frame, via hinge connection $H_{susp}$ and bracket 130).

Thus, in a typical implementation, when air is introduced into the internal air reservoir 152, the air suspension system 110 causes the booster frame 120 to move upward in a substantially even manner. Likewise, in a typical implementation, when air is released from the internal air reservoir 152, the air suspension system 110 allows the front and back of the booster frame 120 to move downward in a substantially even manner.

The booster frame 120 is connected, at its front end to the lockup frame 122 via third hinged connections H3. A substantial portion of the lockup frame 122 extends upward, in a substantially vertical manner, from the axis of the third hinged connections H3. The upper portion of the lockup frame 122 defines the flat, forward-facing surfaces that are substantially vertical. A lower portion of the lockup frame 122 defines a forward-facing surface that flares slightly outward, in a forward direction, from the substantially vertical plane. The lower portion of the lockup frame 122 also has the curved bottom portion that defines the cradle 138 that extends laterally across the lockup frame 122. As mentioned above, the cradle 138 is configured to physically engage and hold/support a portion of the base of the payload 102 when the booster axle 100 is engaged to the payload 102.

As mentioned above, the upper end of the lockup frame 122 is coupled to the lock assemblies 124 via fourth and fifth hinged connections H4 and H5. The booster axle 100 has two lock assemblies 124—one on the right side of the booster axle 100 and one on the left side of the booster axle 100. What follows is a description of one of the lock assemblies, but the description applies equally to either lock assembly 124.

Each lock assembly 124 has a pin P and three different types of links: pin links L1 (of which there are two substantially identical links that are parallel to one another), first coupling links L2 (of which there are two substantially identical links that are parallel to one another), and a second coupling link L3.

Figure 7:
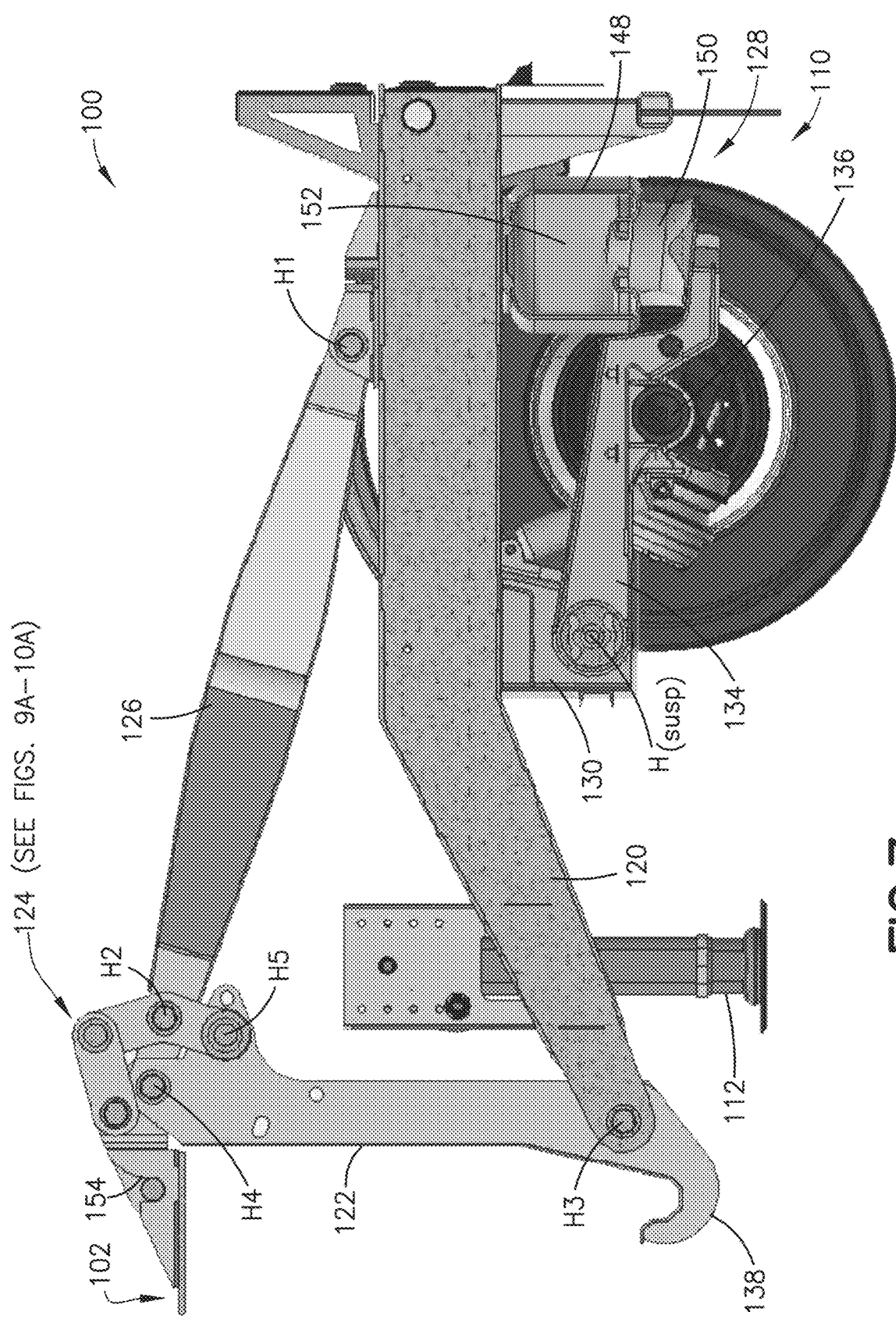
FIG. 7 is a partial side view of a booster axle assembly.
Figure 8:
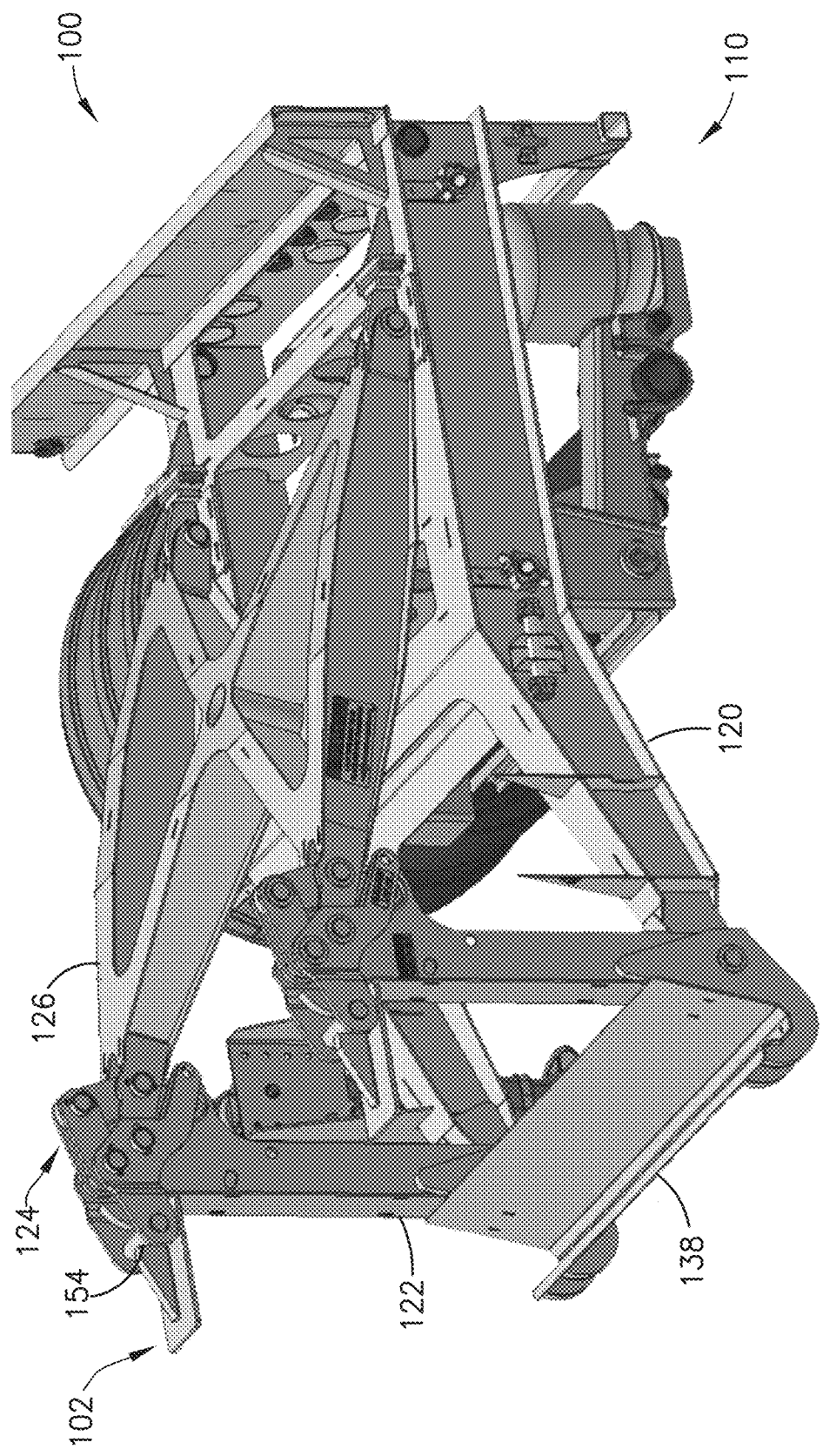
FIG. 8 is a perspective view of a booster axle assembly.

The pin links L1 support the pin P at opposite ends thereof, holding the pin P in a substantially horizontal orientation. The pin links L1 are movable to position the pin P in either a raised (unlocked) position, or in a lowered (locked) position. In the raised (unlocked) position (see FIGS. 9A and 9B), the pin P would not, and does not, engage the corresponding notch (or pin receiver) on the base of the payload 102. In the lowered (locked) position (see FIGS. 10A and 10B), the pin P can securely engage the corresponding pin receiver on the base of the payload 102. FIG. 7 shows a rigid piece of the base of the payload 102 that defines the notch 154 for receiving the pin P. The pin P is shown in FIG. 7 in the lowered (locked) position and fully engaged with the notch 154.

The pin links L1 are attached to, and supported by, the lockup frame 122 by hinged connections H4 near the top of the lockup frame 122. The pin links L1 are configured to rotate about these hinged connections H4 to move the pin P between the raised (unlocked) and lowered (locked) positions. There is a hole 156 in the end of each pin link L1 opposite the pin P. These holes 156 are arranged such that when the pin is in the lowered (locked) position, the holes 156 align with a corresponding hole 157 in the upper part of the lockup frame 122. In that position, a safety locking pin (not shown) can be inserted through holes 156 and hole 157 so that when the pin P is engaged with a corresponding notch on a trailer/payload, the safety locking pin (not shown) helps keep the pin P in the lowered (locked) position, avoiding inadvertent decoupling of the booster axle 100 from the trailer/payload.

In each lock assembly 124, the pin links L1 are flat, have the same shape as one another, and are substantially parallel to one another. Each pin link L1 has a curved portion that terminates in the pin P and a straight portion that terminates in a hole 156.

The pin links L1 are connected (near a middle of their curved portions) to a first end of the first coupling links L2 via a hinged connection H6. The first coupling links L2 are straight and extend from the hinged connection H6 in a substantially rearward direction. The second ends of the first coupling links L2 are connected to a first end of the second coupling link L3 via a hinged connection H7. The second coupling link L3 is angled, with one bend, and extends from the hinged connection H7 in a somewhat downward direction, bending slightly forward. The second end of the second coupling link L3 is connected to the lockup frame 122 at hinged connection H5. The main link 126 is connected to a midsection of the second coupling link L3 near its bend via a hinged connection H2.

The main link 126 extends from the lock assembly 124 in a rearward and downward angled manner (between about 10 and 30 degrees relative to vertical). Again, the back end of the main link 126 is coupled to the booster frame 120 (i.e., a brackets on the booster frame 120) via hinged connections H1.

FIGS. 12A-12C show an example of a payload 102 on a trailer being backed into the booster axle 100 (whose brakes are set) and automatically engaging the booster axle 100. FIGS. 11A-11C show the movements of the booster axle 100 only as the trailer is backed into the booster axle 100 and automatically engages the booster axle 100.

In the illustrated implementation, the back end of the payload 102 has a lip 158 at its lower end that is configured to fit within the cradle 138 at the bottom end of the lockup frame 122 of the booster axle 100. More specifically, in the illustrated implementation, the lip 158 has a cross-sectional configuration that conforms fairly significantly to the shape defined by the cradling surface of the cradle 138. Additionally, the back end of the payload 102 has a notch (not shown in FIGS. 12A-12C, but see 154 in FIGS. 7 and 8) for receiving the pin P on the lock assembly 124 of the booster axle 100.

In FIG. 12A, a trailer (carrying the payload 102) is moved into alignment with the booster axle 100. This may be accomplished by positioning the trailer so that the payload 102 is just in front of the booster axle 100 (as shown), and by adjusting the height of the front of the booster axle 100 so that the distal end of the cradle 138 will fit just beneath the lip 158 on the payload 102 when the payload 102 is backed into the booster axle 100. The height of the front of the booster axle 100 can be adjusted by adjusting the extent to which the dolly legs extend out of their housings.

From FIG. 12A to FIG. 12C, the payload 102 is backed into the booster axle 100. The booster axle 100 has an air brake system with a default configuration to brake in the absence of air. Since air has not yet been connected to (and is not otherwise available to) the booster axle 100, the booster axle brake is set, and prevents backward (or any kind of) rolling motion by the wheels of the booster axle 100. The rigid frame elements of the booster axle 100 are supported by the booster axle's deflated air suspension system 110, which is coupled to and supported by the wheel axle of the booster axle.

As the payload 102 moves back towards the booster axle 100, the lip 158 on the payload 158 moves over the cradle 138 of the booster axle 100. The payload 102 contacts the lockup frame 122 of the booster axle 100 and starts pushing the booster axle 100 in a backward direction. Since the booster axle brake is set, the booster axle 100 does not roll backward despite the fact that the payload 102 is pushing against it. Instead, the tires of the booster axle 100 remain in a fixed position on the ground and the rigid frame elements of the booster axle 100 start moving in an upward and rearward manner relative to the wheel axle 136 of the booster axle 100. The air suspension system 110 gives the rigid frame elements the freedom to move in this manner—upward and rearward relative to the wheel axle 136. The upward movement of the rigid frame elements and the continuing rearward motion of the payload 102 into the booster axle 100 cause the cradle 138 on the booster axle 100 to physically engage the lip 158 on the payload 102.

Once the cradle 138 is fully engaged with the lip 158 on the payload 102, that engagement substantially prevents any further upward movement by the front end of the booster axle 100 even as the payload 102 continues pushing back into the booster axle 100. The back end of the booster axle 100, however, remains free to continue moving upward and rearward relative to the wheel axle 136 as the payload 102 continues to push back into the booster axle 100. This continued movement of the back end of the booster axle 100 in an upward direction, while the front end of the booster axle 100 is kept at the same height (by its engagement to the lip 158) results in the rigid frame elements of the booster axle 100 rotating so that its back end is lifted up more than its front end. This causes the main link 126 to push forward on the lock assemblies 124, which results in the pins P moving into engagement with the corresponding notches on the payload 102.

More specifically, in each lock assembly 124, when the main link 126 pushes forward it causes the second coupling link L3 to pivot about hinged connection H5 and push the first coupling links L2 forward. The first coupling link L2 rotates about hinge H7 relative to the second coupling links L3 as the first coupling link L2 moves forward. The forward motion of the first coupling link L2 causes the pin links L1 to rotate about hinged connection H4 relative to the lockup frame 122. As the pin links L1 rotate about hinged connection H4 relative to the lockup frame 122, the pin links L1 rotate about hinged connection H6 relative to the first coupling link L2. Eventually, the pin links L1 move far enough that the pin P is in the lowered (locked) position and engaged in the corresponding notch 154 on the payload 102.

Once the pin P is in the lowered (locked) position and engaged in the corresponding notch 154 on the payload 102, one or more air hoses may be attached to the booster axle 100 to supply air to the air suspension system 110. Providing air to the booster axle's air suspension system 110 lifts the booster axle 100, which may urge the lock assemblies 124 to keep the pins P in the lowered (locked) position and engaged in the corresponding notch 154 on the payload 102. In a typical implementation, the air is provided from an air compressor on the trailer 104 or a tractor pulling the trailer 104.

Moreover, when the pin P is in the lowered (locked) position and engaged in the corresponding notch 154 on the payload 102, the holes 156 on the pin links L1 are aligned with the corresponding hole 157 in the upper part of the lockup frame 122. In that position, a safety locking pin (not shown) can be inserted through holes 156 and hole 157 to help keep the pin P in the lowered (locked) position, avoiding inadvertent decoupling of the booster axle 100 from the trailer/payload.

Typically, a person will raise the dolly legs 112 as well after attaching the booster axle 100 to the payload 102, but before driving off with the booster axle 100 so attached.

When decoupling the booster axle 100 from the payload 102, a user may simply set the dolly legs 112 to an appropriate height to catch the booster axle 100 when it decouples from the payload 102, remove the safety locking pin holes 156 and hole 157, remove or turn off the air supply from the booster axle 100, and drive the trailer (carrying the payload 102) forward (i.e., away from the booster axle 100). This combination of steps allows the pin P to lift out of the corresponding notch 154 on the payload 102 and allows the booster axle 100 to fall away from the payload 102, onto its dolly legs 112.

Figure 13:
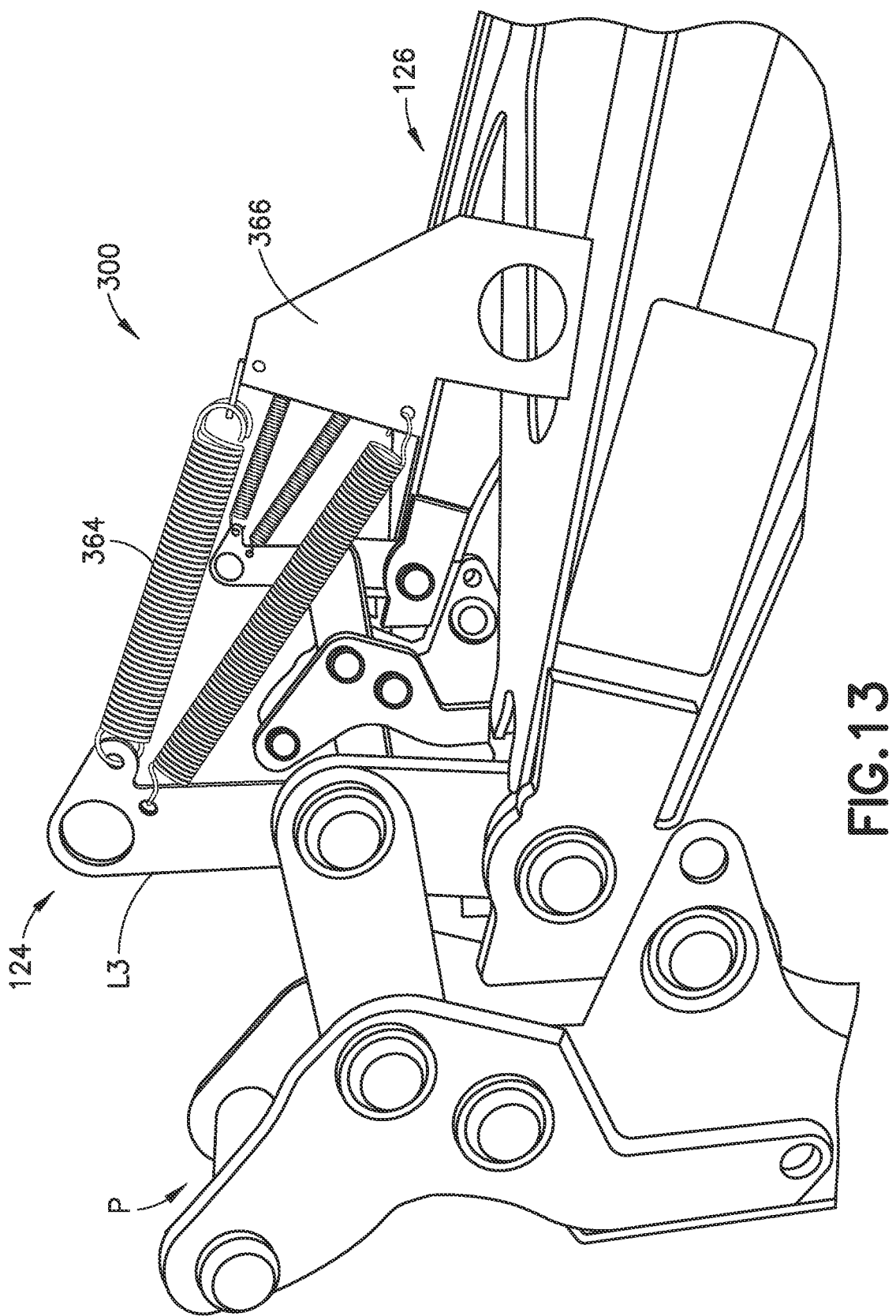
FIG. 13 is a partial, perspective view of an alternative implementation of a booster axle assembly with pins that are spring-loaded to facilitate disengaging a payload.

In some implementations, the lock assemblies 124 are spring-loaded to urge the pins P out of engagement with the corresponding notches on the payload 102 when the booster axle is being disengaged from the payload 102. FIG. 13 is a partial view of a booster axle 300 that is similar to the booster axle 100, except, in the booster axle 300 of FIG. 16, the coupling link L3 extends in an upward direction beyond the point where it is connected to coupling link L2. Mechanical springs 364 are coupled to upper end of this extended coupling link L3 and coupled to a bracket 366 that is attached to the main link 126. These springs 364 are tension springs that urge the lock assembly 124 to move pin P out of engagement with the corresponding notch 154 on the payload 102 when the booster axle 100 is to be disengaged from the payload 102.

Figure 15:
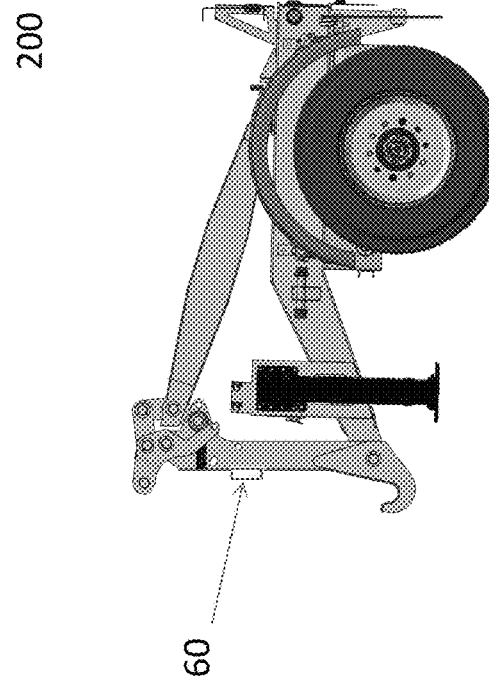
FIG. 15 is a side view of the booster axle assembly of FIG. 14.
Figure 16:
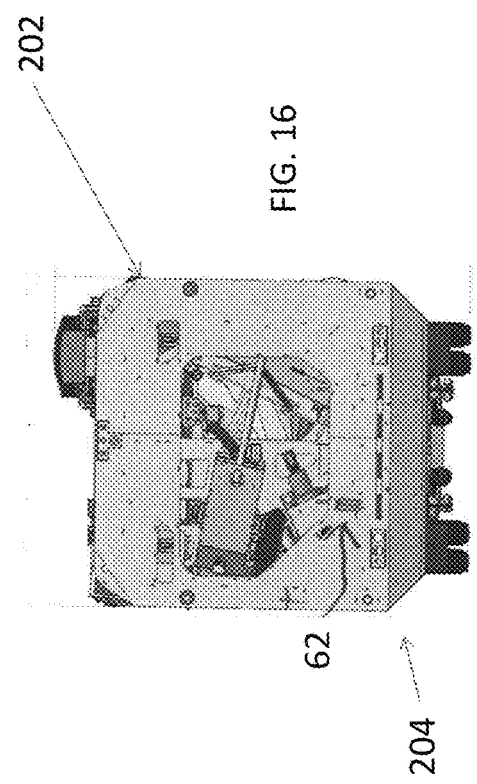
FIG. 16 is a rear view of an exemplary payload with a mating receptacle for the alignment guide in the booster axle assembly of FIGS. 14 and 15.
Figure 14:
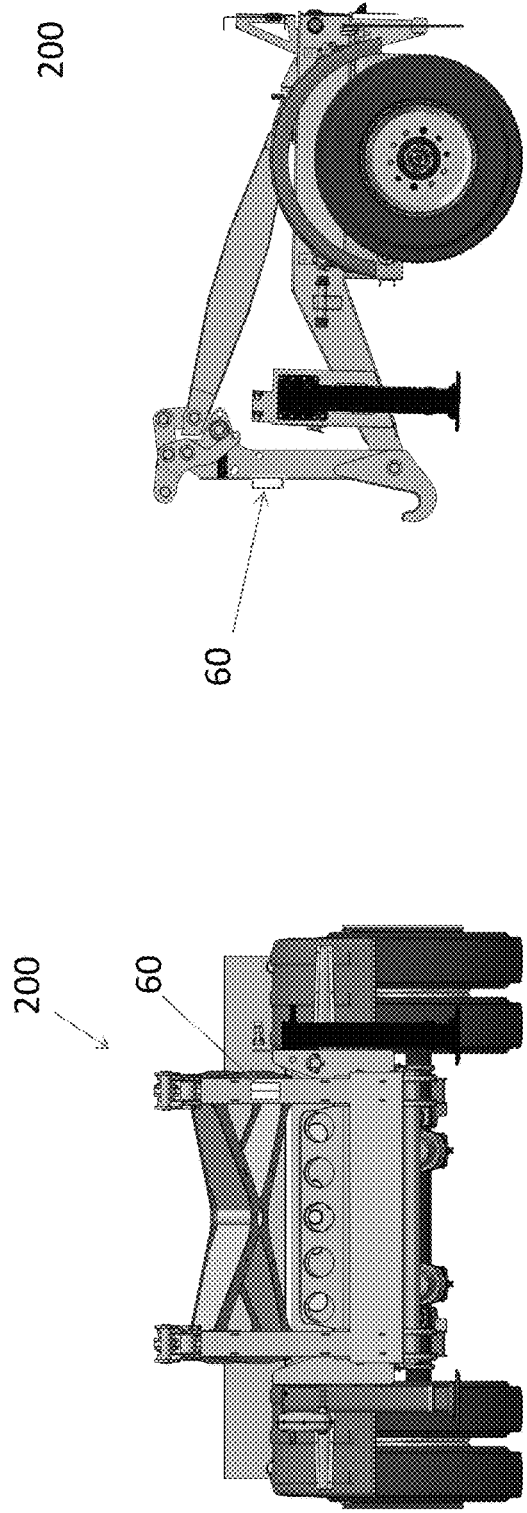
FIG. 14 is a front view of yet another alternative implementation of a booster axle assembly that includes an alignment guide to facilitate proper lateral alignment with a payload.

In some implementations, the booster axle and the payload have mating alignment guides that facilitate proper lateral alignment of the booster axle to the payload when being coupled together. FIGS. 14 and 15 show an example of a booster axle 200 and FIG. 16 shows an example of a payload 202 (on a trailer 204) that have mating alignment guides. More specifically, the booster axle 200 in FIGS. 14 and 15 has a locating wedge 60 that extends from an otherwise flat and substantially vertical forward-facing surface of the lockup frame 122, and the rearward-facing surface of the payload 202 has a corresponding wedge-shaped receptacle 62 configured to receive the locating wedge 60 on the booster axle 200 when the payload 202 is backed into the booster axle 200. In a typical implementation, the mating of the locating wedge 60 and the wedge-shaped receptacle help ensure, and maintain, proper alignment between the payload/trailer and the booster axle 200, when they are engaged to one another.

A number of embodiments of the invention have been described. Nevertheless, it will be understood that various modifications may be made without departing from the spirit and scope of the invention.

For example, the payload can be virtually any kind of payload or trailer configured (e.g., with a lip and/or notch, or the like) to mate with the booster axle assembly disclosed herein.

The rigid frame elements (e.g., the booster frame, the main link, the lock assembly, the lockup frame, etc.) disclosed herein may be formed from virtually any rigid material (e.g., steel or the like) and may be formed, as shown in the drawings, using beam-like or other shapes or structures, appropriately formed and configured. Moreover, various aspects of each rigid frame element can vary from what has been shown and described herein in a wide variety of ways including in absolute and relative size, shape, configuration, etc.

The specific configuration of the lock assembly (and its pin, various links, and/or hinged connections) can vary and still perform in the manner described herein—moving the pin (or other latching element) into engagement with a corresponding latching element on the payload in response to the payload being pushed into the booster axle assembly. The size, dimension and number of each link can vary. Moreover, the hinges disclosed herein can be virtually any type of device for holding together two parts such that one can swing relative to the other.

The booster axle assembly described above has air brakes. However, it is possible that any other type of braking system may be used instead.

Various degrees of adjustability may be provided into the booster axle assembly, with height adjustments possible (e.g., with the dolly legs or otherwise), positional adjustments possible (e.g., with the use of shims, etc.), etc.

The suspension system disclosed above is an air suspension system. However, other types of suspension systems, such as hydraulic suspension systems, may be used instead.

The booster axle disclosed herein is described primarily as connecting to a payload on a trailer. However, the booster axle could easily be connected to the trailer itself. The trailer would simply include appropriate structural features (e.g., the notch and the lip) for the booster axle to engage directly.

Moreover, while this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. For example, the booster axle assembly 100 in FIG. 2 may be provided with an alignment guide (as in FIGS. 14 and 15) as well as with springs (as in FIG. 13). Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are disclosed herein as occurring in a particular order, this should not be understood as requiring that such operations be performed in the particular order shown or in sequential order, or that all represented operations be performed, to achieve desirable results.

Other implementations are within the scope of the claims.

What is claimed is:

1. A booster axle assembly comprising:
a wheel axle;
a suspension system coupled to the wheel axle;
a booster frame supported by the suspension system;
a main link coupled, via a first hinged connection, to a rear portion of the booster frame and extending from the first hinged connection in an upward and forward direction;
a lock assembly coupled to a forward end of the main link via a second hinged connection; and
a lockup frame coupled to a front end of the booster frame by a third hinged connection and coupled to the lock assembly by a fourth hinged connection and a fifth hinged connection,
wherein the lockup frame comprises a curved bottom portion that defines a cradle,
wherein the lock assembly comprises:
a pin; and
a plurality of links and hinged connections configured to move the pin between a first position and a second position,
wherein the pin is closer to the cradle in the second position than in the first position.

2. The booster axle assembly of claim 1, wherein the plurality of links and hinged connections comprises:
a pin link;
a first coupling link; and
a second coupling link,
wherein the pin link supports the pin, is coupled to the lockup frame by the fourth hinged connection, and is coupled to the first coupling link by a sixth hinged connection;
wherein the first coupling link is coupled to the second coupling link at a seventh hinged connection.

3. The booster axle assembly of claim 2, further comprising:
surfaces on the pin link that define a first hole; and
surfaces on the lockup frame that define a second hole,
wherein the first hole lines up with the second hole when the pin is in the second position.

4. The booster axle assembly of claim 3, further comprising:

a safety locking pin configured to fit into the first hole and second hole when the pin is in the second position and the first hole and the second hole are aligned.

5. The booster axle assembly of claim 1, further comprising:
one or more springs coupled to the lock assembly and to the main link, and configured to urge the lock assembly to move the pin from the second position to the first position.

6. The booster axle assembly of claim 1, wherein the suspension system is an air suspension system.

7. The booster axle assembly of claim 1, further comprising air brakes coupled to the wheel axle.

8. The booster axle assembly of claim 1, further comprising:
an adjustable dolly leg that extended in a downward direction from a dolly leg housing.

9. A system to facilitate coupling a booster axle assembly to a payload on a trailer, the system comprising:
a booster axle assembly comprising:
a wheel axle;
a suspension system coupled to the wheel axle;
a booster frame supported by the suspension system;
a main link coupled, via a first hinged connection, to a rear portion of the booster frame and extending from the first hinged connection in an upward and forward direction;
a lock assembly coupled to a forward end of the main link via a second hinged connection; and
a lockup frame coupled to a front end of the booster frame by a third hinged connection and coupled to the lock assembly by a fourth hinged connection and a fifth hinged connection, wherein the lockup frame comprises a curved bottom portion that defines a cradle; and
a payload on a trailer, or a trailer carrying a payload comprising:
a back end with a lip configured to fit within the cradle on the booster axle assembly; and
a structural element to mate with the lock assembly on the booster axle assembly,
wherein the lock assembly of the booster axle assembly comprises:
a pin; and
a plurality of links and hinged connections configured to move the pin between a first position and a second position,
wherein the pin is closer to the cradle in the second position than in the first position, and
wherein the plurality of links and hinged connections comprises:
a pin link;
a first coupling link; and
a second coupling link,
wherein the pin link supports the pin, is coupled to the lockup frame by the fourth hinged connection, and is coupled to the first coupling link by a sixth hinged connection;
wherein the first coupling link is coupled to the second coupling link at a seventh hinged connection.

10. The system of claim 9, wherein the lock assembly of the booster axle assembly further comprises:
surfaces on the pin link that define a first hole;
surfaces on the lockup frame that define a second hole, wherein the first hole lines up with the second hole when the pin is in the second position; and
a safety locking pin configured to fit into the first hole and second hole when the pin is in the second position and the first hole and the second hole are aligned.

11. The system of claim 9, further comprising:
one or more springs coupled to the lock assembly and to the main link, and configured to urge the lock assembly to move the pin from the second position to the first position.

12. The system of claim 9, wherein the suspension system is an air suspension system, further comprising air brakes coupled to the wheel axle.

13. The system of claim 9, further comprising an adjustable dolly leg that extended in a downward direction from a dolly leg housing.

14. The system of claim 9, wherein the structural element on the payload or trailer to mate with the lock assembly on the booster axle assembly is a notch formed in a bracket.

15. The system of claim 9, further comprising:
mating alignment guides on the booster axle assembly and the payload or trailer.

16. A method of securing a booster axle assembly to a payload on a trailer, the method comprising:
providing a booster axle assembly comprising:
a wheel axle;
a suspension system coupled to the wheel axle;
rigid frame elements comprising:
a booster frame supported by the suspension system;
a main link coupled, via a first hinged connection, to a rear portion of the booster frame and extending from the first hinged connection in an upward and forward direction;
a lock assembly coupled to a forward end of the main link via a second hinged connection; and
a lockup frame coupled to a front end of the booster frame by a third hinged connection and coupled to the lock assembly by a fourth hinged connection and a fifth hinged connection, wherein the lockup frame comprises a curved bottom portion that defines a cradle; and
positioning a payload onto a trailer, wherein the payload or the trailer comprises:
a lip configured to fit within the cradle on the booster axle assembly; and
a structural element configured to mate with the lock assembly on the booster axle assembly; and
pushing the payload into the booster axle assembly with the trailer, or pushing the trailer into the booster axle assembly,
wherein booster axle assembly brakes are set while the payload or trailer is being pushed into the booster axle assembly,
wherein as the payload or trailer moves towards the booster axle assembly;
the lip on the payload moves over the cradle of the booster axle assembly;
the payload contacts the lockup frame of the booster axle assembly and starts pushing the booster axle assembly on a backward direction;
the rigid frame elements of the booster axle assembly start moving in an upward and rearward manner relative to the wheel axle of the booster axle assembly;
the cradle on the booster axle assembly physically engages the lip on the payload, substantially preventing any further upward movement by a front end of the booster axle assembly even as the payload continues pushing back into the booster axle;

a back end of the booster axle assembly continues to move in an upward direction, causing the main link to push forward on the lock assembly, which results in a pin on the lock assembly moving into engagement with the corresponding structural element on the payload.

* * * * *